United States Patent [19]
Kakizaki

[11] Patent Number: 5,148,895
[45] Date of Patent: Sep. 22, 1992

[54] ROTARY ACTUATOR FOR VARIABLE DAMPING FORCE SHOCK ABSORBER

[75] Inventor: Shinobu Kakizaki, Kanagawa, Japan

[73] Assignee: Atsugi Motor Parts Company, Limited, Kanagawa, Japan

[21] Appl. No.: 699,499

[22] Filed: May 14, 1991

Related U.S. Application Data

[63] Continuation of Ser. No. 311,941, Feb. 16, 1989, abandoned.

[30] Foreign Application Priority Data

Feb. 17, 1988 [JP] Japan ............... 63-34399

[51] Int. Cl.⁵ .................. F16F 9/50; H02K 21/14
[52] U.S. Cl. .................. 188/299; 188/319; 251/129.11; 310/89; 310/156
[58] Field of Search .............. 188/299, 319; 310/89, 310/156; 251/129.11, 129.12, 129.13; 335/272

[56] References Cited

U.S. PATENT DOCUMENTS

| | | | |
|---|---|---|---|
| 4,104,552 | 8/1978 | Tsergas | 310/156 |
| 4,398,562 | 6/1983 | Saarem et al. | 251/129.12 X |
| 4,596,320 | 6/1986 | Shimokura et al. | 188/299 |
| 4,647,007 | 3/1987 | Bajka | 251/129.12 X |
| 4,702,123 | 10/1987 | Hiran et al. | 188/317 X |
| 4,726,453 | 2/1988 | Obstfelder et al. | 188/299 X |

FOREIGN PATENT DOCUMENTS

| | | | |
|---|---|---|---|
| 2918936 | 11/1979 | Fed. Rep. of Germany | 310/156 |
| 2149673 | 3/1973 | France . | |
| 2209247 | 6/1974 | France . | |
| 58-72546 | 5/1983 | Japan . | |
| 162758 | 9/1984 | Japan | 310/156 |
| 1455704 | 11/1976 | United Kingdom | 310/156 |
| 2062356 | 5/1981 | United Kingdom . | |
| 2150258 | 6/1985 | United Kingdom . | |

OTHER PUBLICATIONS

Machine Design, vol. 56, pp. 115–118, Sep. 1984, by Waldspurger et al.

*Primary Examiner*—George E. A. Halvosa
*Attorney, Agent, or Firm*—Bachman & LaPointe

[57] ABSTRACT

A rotary actuator comprises a housing made of a synthetic resin. A rotor carrying a plurality of permanent magnet of alternate polarity with respect to the adjacent magnet, and stator having a plurality of electromagnet which is selectively energized, are aligned in axial alignment to each other. Magnetic conductor plates are provided in alignment with the rotor and the stator. The magnetic conductor plates are supported on the inner periphery of the resin housing in opposition to the rotor and the stator for forming part of a magnetic circuit.

42 Claims, 4 Drawing Sheets

ROTARY ACTUATOR FOR VARIABLE DAMPING FORCE SHOCK ABSORBER

This is a continuation, of application Ser. No. 311,941 filed Feb. 16, 1989 now abandoned.

BACKGROUND OF THE INVENTION

1. Field of the Invention

The present invention relates generally to a variable damping force shock absorber with a rotary valve for adjusting flow restriction of a working fluid for adjusting damping force to be generated in response to input shock. More specifically, the invention relates to a rotary actuator for driving the rotary valve for rotatingly drive the latter in order to adjust flow restriction against fluid flow in order to adjust damping characteristics.

2. Description of the Background Art

In the recent years, there have been developed various constructions of variable damping force shock absorber assemblies which is variable of damping characteristics for facilitating variable suspension characteristics in an automotive suspension system. Among such various constructions of variable damping force shock absorber assemblies, some of the shock absorber assemblies includes rotary valves to be rotatingly driven for varying flow resistance against working fluid in the shock absorbers and whereby adjusting damping characteristics. Such rotary valve-type variable damping force shock absorber assemblies have been disclosed in the U.S. Pat. No. 4,600,215, issued on Jul. 15, 1986, to Kuroki et al, for example. In the shown construction, the rotary valve member defines a plurality of orifices respectively having different path areas for varying flow rate of the working fluid to flow between upper and lower fluid chambers in the shock absorber. The rotary valve member, as driven, varies angular position to establish fluid communication between the aforementioned upper and lower fluid chambers of the shock absorber through one of the orifices. With this construction, flow restriction magnitude for the working fluid is variable depending upon the angular position of the rotary valve member for varying the damping characteristics of the variable damping force shock absorber assembly.

On the other hand, in order to drive the rotary valve member for adjusting the damping characteristics, an electromagnetically operable actuator may be provided in the shock absorber assembly. One of the examples of such electromagnetically operable actuator has been disclosed in the Japanese Utility Model First (unexamined) Publication (Jikkai) Showa 58-72546. The actuator disclosed in the above-identified Japanese Utility Model First Publication, comprises a stationary table fixed onto the top of a piston rod, an actuation rod drivingly connected to the rotary valve member, a rotor having permanent magnets and fixed to the actuation rod, and a stator which has a plurality of electromagnets. The electromagnets are arranged at positions radial outside of the permanent magnet and designed to be selectively energized for driving the rotor.

In order to improve such prior proposed construction of the variable damping force shock absorber, U.S. Pat. No. 4,776,437, issued on Oct. 11, 1988, which has been assigned to the common assignee to the present invention. The proposed variable damping force shock absorber includes an improved rotary actuator which is designed for rotatingly drive a rotary body, such as a rotary valve member for adjusting damping force to be created by a variable damping force shock absorber. The rotary actuator takes a layout of a permanent magnet and an electromagnet arranged in vertically spaced relationship. The vertical layout of the permanent magnet and the electromagnet reduces the plane area required for installation of the actuator.

In the shown construction, the rotary actuator comprises a housing, an output shaft, a rotor and a stator. The housing is made of magnetically conductive metallic material for serving as part of a magnetic circuit, and includes an upper cover member and an essentially disc-shaped base plate. The upper cover member is of generally reversed bowl-shaped configuration having axially extending circumferential wall section and laterally extending upper wall section adjoining at the circumferential edge to the circumferential wall section. The lower edge of the circumferential section of the upper cover member engages with the circumferential edge of the base plate in order to define an enclosed space therebetween. The output shaft, the rotor and the stator are housed within the enclosed space. The flanges are integrally formed with the base plate.

The metallic housing in the prior proposed construction encounters a difficulty in assembling. Namely, the upper cover member and the base plate are assembled to each other by calking welding or bonding. When welding is used for assembling the upper cover member and the base plate, paint can be removed during welding operation. This requires additional rust proving treatment after welding operation. Furthermore, air tight seal is required for assuring air tight engagement between the cover member and the base plate. On the other hand, when bonding is used for assembling the cover member and the base plate, movable parts which have to be movably assembled can be fixed by bonding agent which flow out from the bonding section. This lowers the yield of the product.

SUMMARY OF THE INVENTION

It is an object of the present invention to provide a rotary actuator which can solve the aforementioned defects or drawbacks in the prior proposed actuator for making assembling operation easier and for holding satisfactorily high yield.

In order to accomplish aforementioned and other objects, a rotary actuator, according to the present invention, comprises a housing made of a synthetic resin. A rotor carrying a plurality of permanent magnets of alternate polarity with respect to the adjacent magnet, and stator having a plurality of electromagnets which is selectively energized, are aligned in axial alignment to each other. Magnetic conductor plates are provided in alignment with the rotor and the stator. The magnetic conductor plates are supported on the inner periphery of the resin housing in opposition to the rotor and the stator for forming part of a magnetic circuit.

According to one aspect of the invention, a rotary actuator for rotatingly driving a rotatable member, comprises:

a rotary shaft connected to a rotatable member for rotation therewith;

a rotor assembly cooperated with the rotary shaft for rotation therewith and carrying a plurlity of permanent magnets;

a stator assembly provided essentially in axial alignment with the rotor assembly and including a plurality of electromagnets selectively energized to have polarity according to polarity of power supply for selectively generating magnetic fields extending through the permanent magnet for producing repulsive force and drawing force serving as driving force for rotatingly driving the rotor assembly;

switch means for controlling polarity of power supply for respective electromagnets for energizing the latter according to a predetermined schedule;

an enclosed housing for receiving the rotary shaft, the rotor assembly and the stator assembly therein, the housing being formed of a synthetic resin material; and magnetically conductive means made of a magnetically conductive material and disposed within the housing and so oriented respectively between the rotor assembly and a peripheral wall of the housing mating with the rotor assembly, and between the stator assemble and a peripheral wall of the housing mating with the stator assembly as to complete magnetic circuit.

According to another aspect of the invention, a rotary actuator for a variable damping force shock absorber which includes a rotary valve driven by the rotary actuator for varying damping characteristics, comprises:

a rotary shaft connected to a rotatable member for rotation therewith;

a rotor assembly including a plurality of permanent magnets including a first permanent magnet having a first pole at first side and a second pole at second side thereof and a second permanent magnet having the second pole at the first side and the first pole at the second side, the permanent magnet being associated with the rotary shaft for rotatingly drive the latter according to angular displacement thereof;

a stator assembly provided essentially in alignment with the rotor assembly along the axis of the rotary shaft and opposing to the first side of the permanent magnet, the stator assembly including a plurality of electromagnets which are arranged at axially spaced apart relationship with the permanent magnet with a predetermined clearance in a direction of the axis of the rotary shaft, each of the electromagnets being adapted to be energized in first mode to have the second pole at the side adjacent the permanent magnet and the first pole at the side remote from the permanent magnet when it opposes the first permanent magnet, and in second mode to have the first pole at the side adjacent the permanent magnet and the second pole at the side remote from the permanent magnet when it opposes the second permanent magnet switch means for selectively energizing the electromagnets for rotatingly driving the permanent magnet with the rotatable member via the rotary shaft;

an enclosed housing for receiving the rotary shaft, the rotor assembly and the stator assembly therein; and magnetically conductive means disposed within the housing and so oriented respectively between the rotor assembly and a peripheral wall of the housing mating with the rotor assembly, and between the stator assemble and a peripheral wall of the housing mating with the stator assembly as to establish closed magnetic circuit.

In the practical construction, the housing comprising an upper member and a lower member respectively having first sections extending essentially perpendicular to the axis of the output shaft and second sections extending from peripheral edge of the first sections toward the other member, the second sections having tip end edges mating to each other. The second section of one of the upper and lower member may be formed with a groove extending along the tip end edge and the second section of the other of the upper and lower member may be provided a projection extending from the tip end edge and having configuration conforming the groove, the projection engaging with the groove when the housing is assembled for establishing air-tight seal therebetween.

On the other hand, the rotor assembly may comprise a rotor body rotatably cooperated with the output shaft and having retainer sections made of a magnetically insulative synthetic resin and supporting the permanent magnets in a circumferentially spaced relationship to each other with a given intervals. The magnetically conductive means may comprise a first element disposed between the permanent magnet of the rotor assembly and a mating peripheral wall of the housing and having a plane surface opposing to the permanent magnet with a predetermined air gap, and a second element disposed between the electromagnets of the stator assemble and magnetically connected thereto. In such case, the first and second elements of the magnetically conductive means are of annular disc-shaped configurations forming complete circle extending along rotational trace of the permanent magnet. The first element has a plurality of projecting portions, each having the plane surface and projecting toward the permanent magnet for opposing to the latter with the given air gap, and a remaining portion having a plane surface opposing the permanent magnet with a clearance greater than the given air gap. Each of the projecting portions has tapered circumferentially extending edges and sharply bent radially extending edge forming right angle edge so as to define border of the magnetic field.

According to a further aspect of the invention, a variable damping force shock absorber for an automotive suspension system, comprises:

a shock absorber cylinder defining a fluid chamber therein, which shock absorber cylinder is disposed between sprung mass and unsprung mass of the automotive suspension system;

a piston disposed within the fluid chamber of the shock absorber cylinder and dividing the fluid chamber into upper first and lower second pressure chambers;

a piston rod connecting the piston to one of the sprung and unsprung mass for causing thrusting movement along the shock absorber cylinder;

fluid communication path means defining a fluid communication path for establishing fluid communication between the first and second pressure chambers;

a rotary valve member disposed within the fluid communication path for adjusting path area of the fluid communication path for whereby adjusting damping characteristics of the shock absorber;

a rotary actuator for rotatingly driving a rotatable member, including:
 a rotary shaft connected to a rotatable member for rotation therewith;
 a rotor assembly cooperated with the rotary shaft for rotation therewith and carrying a plurality of permanent magnets;
 a stator assembly provided essentially in axial alignment with the rotor assembly and including a plurality of electromagnets selectively energized to have polarity according to polarity of power supply for selectively generating magnetic fields extending through the permanent magnet for producing repulsive force and drawing force serving as driving force for rotatingly driving the rotor assembly;

switch means for controlling polarity of power supply for respective electromagnets for energizing the latter according to a predetermined schedule;

an enclosed housing for receiving the rotary shaft, the rotor assembly and the stator assembly therein, the housing being formed of a synthetic resin material; and magnetically conductive means made of a magnetically conductive material and disposed within the housing and so oriented respectively between the rotor assembly and a peripheral wall of the housing mating with the rotor assembly, and between the stator assemble and a peripheral wall of the housing mating with the stator assembly as to complete magnetic circuit; and a mode selector means associated with the actuator, for selecting one of a plurality of damping characteristics modes and for selectively energizing one of the electromagnets corresponding to selected one of damping characteristics modes.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
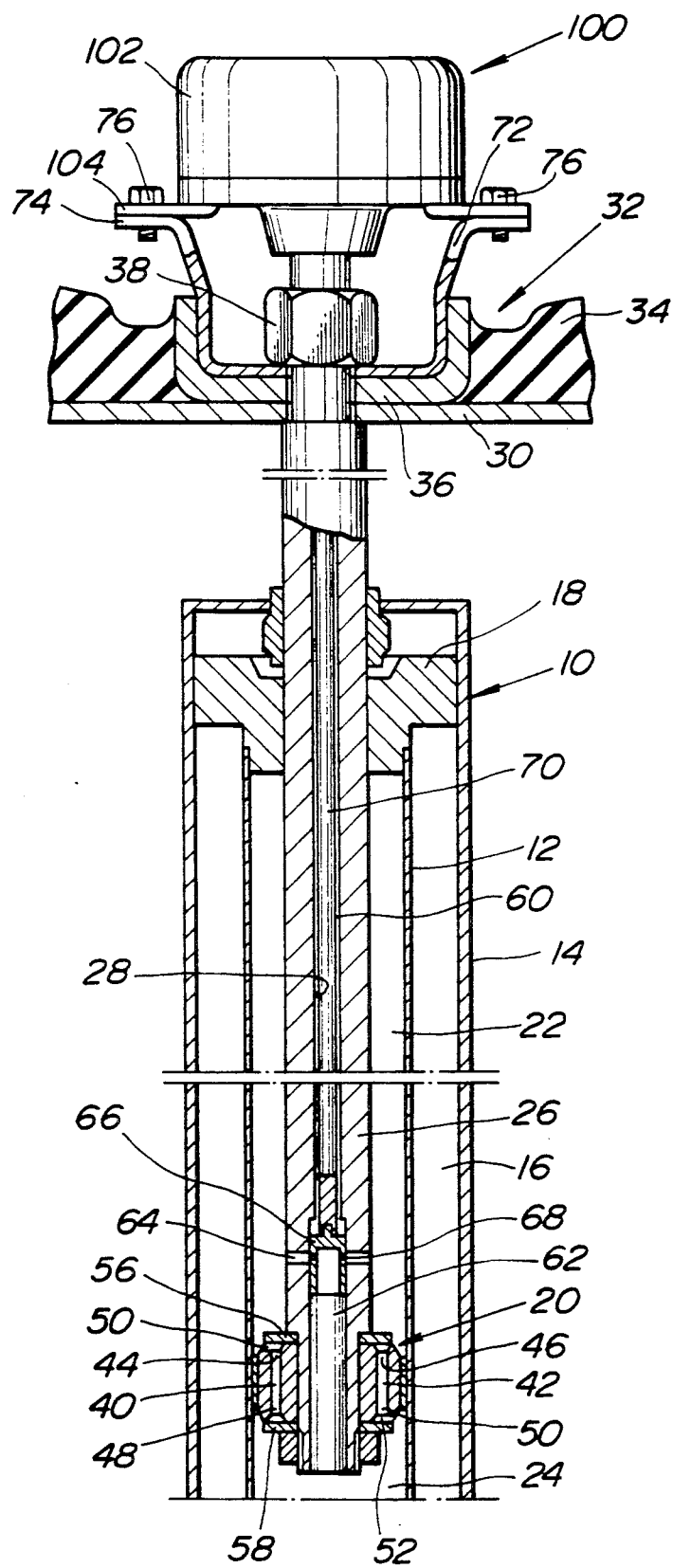
FIG. 1 is a fragmentary sectional view of one example of a variable damping force shock absorber assembly, to which the preferred embodiment of a rotary actuator according to the present invention is applied.

Referring now to the drawings, particularly to FIG. 1, a rotary actuator which is generally represented by the reference numeral "100" is employed in a variable damping force or damping characteristics adjustable hydraulic shock absorber which is generally represented by the reference numeral "10". In the shown example, the variable damping force shock absorber 10 comprises a double-action type hydraulic shock absorber which has coaxially arranged inner and outer cylinders 12 and 14. The inner cylinders 12 is disposed in the outer cylinder 14 to define therebetween an annular fluid chamber 16. The annular fluid chamber 16 defined between the inner and outer cylinders 12 and 14 is in communication with an internal chamber of the inner cylinder 12 in a per se well known manner. The top end of the inner cylinder 12 is sealingly closed by a end plug 18 in a liquid-tight fashion. A thrusting piston 20 is slidably disposed within the internal chamber of the inner cylinder 12 to divide the chamber into upper and lower pressure chambers 22 and 24. The upper and lower pressure chambers 22 and 24 and the fluid reservoir chamber 16 are filled with hydraulic working fluid.

The piston 20 is rigidly secured at the lower end of a piston rod 26 which is in a hollow cylindrical form to define an axially extending through opening generally being represented by the reference numeral "28". The upper end of the piston is connected to the upper end wall 30 of a strut housing defined in the vehicle body. An upper mount insulator assembly 32 is interposed between the top end of the piston rod 26 and the upper end wall 30 in order to absorb high frequency vibration energy transmitted from the piston rod to the vehicle body so that uncomfortable high frequency road shock input through vehicular wheel cannot be transmitted to the vehicle body. The upper mount insulator assembly 32 generally comprises an insulator rubber 34 and a collar 36. The upper mount insulator assembly 32 is rigidly secured to the upper end wall 30 of the strut housing by means of fastening nut 38 together with the top end of the piston rod 26.

Though it is not shown in the accompanying drawings, the outer cylinder 14 is connected to a suspension member, such as suspension link, suspension arm and so forth in a per se well known manner. Therefore, the shock absorber is disposed between the vehicle body and the suspension member for absorbing shock to be transmitted between the vehicle body and the suspension member. Since the shown embodiment employs the double-action type shock absorber, shock absorbing damping force may be created in the bounding and rebouding strokes of the piston 26.

The piston 26 is formed with a plurality of axially extending fluid path openings 40 and 42, each having the upper end opening 44 and 46 toward the upper pressure chamber 22 and the lower end opening 48 and 50 toward the lower pressure chamber 24. As seen from FIG. 1, the piston 26 is formed with a recess 52 adjoining the upper end 44 of the fluid path opening 40 on the upper surface directed to the upper pressure chamber 22, and a recess 54 adjoining the lower end 50 of the fluid path opening 42 on the lower surface of the piston. Disc-shaped valve members 56 and 58 are attached on the upper and lower surfaces of the piston. The disc-shaped valve member 56 is so designed as to openably close the upper end 46 of the fluid path opening 42 and the disc-shaped valve member 58 openably closes the lower end 48 of the fluid path opening 40. On the other hand, because of presence of the recesses 52 and 54, the upper end 44 of the fluid path opening 40 and the lower end 50 of the fluid path opening 42 are constantly held open.

Therefore, in the piston compression stroke (downward stroke), the working fluid pressure in the lower pressure chamber 24 as compressed by downward movement of the piston flows from the lower pressure chamber to the upper pressure chamber 22 via the fluid path opening 42. During the flow of the working fluid through the fluid path opening 42, the disc-shaped valve member 56 is pushed upwardly to open the upper end 46 to allow the working fluid in the fluid path opening 42 to flow into the upper fluid chamber 22. At this time, since the working fluid pressure in the lower pressure chamber 24 is higher than that in the upper pressure chamber, the disc-shaped valve member 58 is held at the position sealingly closing the lower end 48 of the fluid path opening 40 to block fluid communication between the upper and lower pressure chambers 22 and 24 therethrough. On the other hand, piston expansion stroke (upward stroke), the working fluid pressure in the upper pressure chamber 22 as compressed by downward movement of the piston flows from the upper pressure chamber to the lower pressure chamber 24 via the fluid path opening 40. During the flow of the working fluid through the fluid path opening 40, the disc-shaped valve member 58 is pushed downwardly to open the lower end 48 to allow the working fluid in the fluid path opening 50 to flow into the lower fluid chamber 24. At this time, since the working fluid pressure in the upper pressure chamber 22 is higher than that in the lower pressure chamber 24, the disc-shaped valve member 56 is held at the position sealingly closing the lower end 46 of the fluid path opening 42 to block fluid communication between the upper and lower pressure chambers 22 and 24 therethrough.

The through opening 28 of the piston rod 26 is divided into an upper smaller diameter section 60 and a lower larger diameter section 62. One or more orifices 64 are formed through the peripheral wall of the hollow cylindrical piston rod 26. The orifices respectively extend radially transverse to the axis of the piston rod 26 and have inner ends opening adjacent the upper end of the lower larger diameter section 62 of the through opening and outer ends opening toward the upper pressure chamber 22. On the other hand, the lower end of the through opening 28 opens toward the lower pressure chamber 24. Therefore, the upper and lower chambers 22 and 24 are also communicated through the orifices 64 and the larger diameter section 62.

A rotary valve 66 is disposed in the larger diameter section 62. The rotary valve 66 has a peripheral wall opposing to the inner ends of the orifices 64. A plurality of communication openings 68 (only two are shown) are formed through the peripheral wall of the rotary valve member 66. The plurality of orifices 68 respectively extend in transverse direction to the axis of the piston rod and have outer end opposing the orifices 64. The orifices 68 are separated into several groups and have different diameter to that in other groups. The rotary valve member 66 is rotatable to change its angular position to one group of orifices 68 to the orifices 64 for establishing fluid communication between the upper and lower pressure chambers 22 and 24 therethrough. Therefore, depending upon the angular position of the rotary valve member 66, the group of the orifices 68 to be aligned with the orifice 64 is varied to vary the path area for fluid flow between the upper and lower pressure chambers 22 and 24. Since flow restriction of the combined orifices 64 and 68 is variable depending upon the angular position of the rotary valve member 66. Therefore, damping force to be created by the shock absorber is variable depending upon the angular position of the rotary valve member 66.

The rotary valve member 66 is formed integrally with an actuation rod 70. The actuation rod 70 extends through the smaller diameter section 60 of the through opening 28 and is connected to the rotary actuator 100 so that it may be driven with the rotary valve member 66 for varying the angular position and thereby varying the damping characteristics.

In the shown embodiment, the rotary actuator 70 is mounted on the top of the piston rod 26 and supported by an actuator bracket 72. The actuator bracket 72 is of generally deep dish-shaped configuration and mounted on the collar 36 of the upper mount insulator assembly 32. The actuator bracket 72 is secured onto the upper mount insulator assembly 32 by the fastening nut 38. A flange 74 laterally extends from the upper edge of the actuator mount 72. On the other hand, the rotary actuator 70 has a housing 102 having a laterally extending flange 104. The flange 104 of the rotary actuator housing 102 mates with the flange 74 of the actuator mount 72 and is rigidly secured thereto by means of fastening bolts 76.

In practice, the rotary actuator 70 is operable by a damper control signal which is indicative of the desired damping characteristics of the shock absorber. The damper control signal is produced by manual selection of a manual switch (not shown). On the other hand, the control signal may be produced based on the vehicle driving condition as detected by various sensors, in an automatic suspension control. One example of the automatic suspension control system has been disclosed in the aforementioned U.S. Pat. No. 4,600,215. On the other hand, the structure of the shock absorber with a rotary valve member which is operable by manual operation of the manually operable switch, has been disclosed in the U.S. Pat. No. 4,526,401, issued on Jul. 2, 1985. The disclosure of the above-identified U.S. Patents are herein incorporated by reference for the sake of disclosure.

Figure 2:
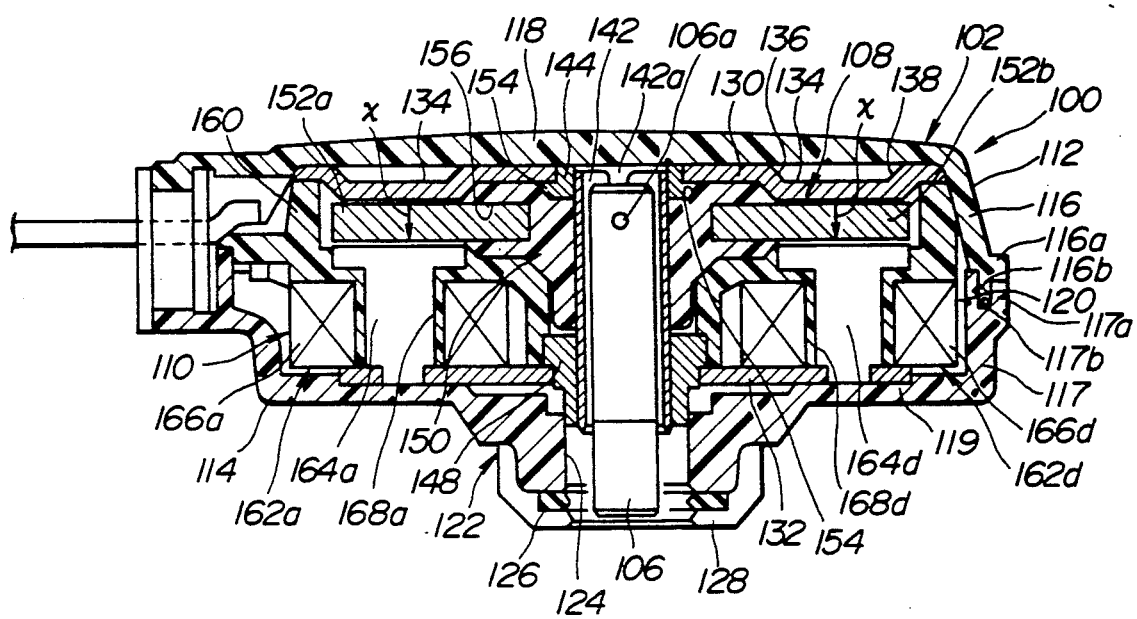
FIG. 2 is a transverse section of the rotary actuator in FIG. 1, as taken along line II—II of FIG. 1.
Figure 3:
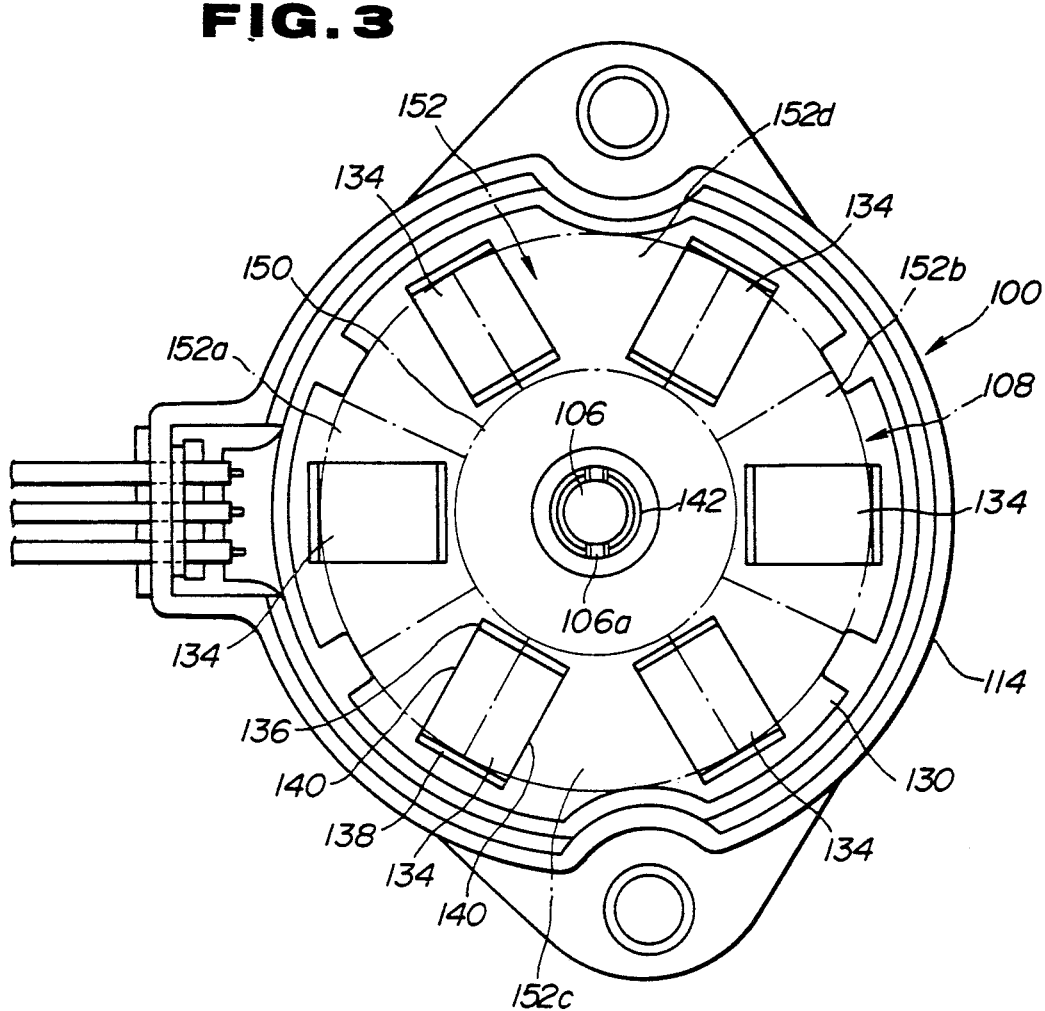
FIG. 3 is a plan view of the rotary actuator, in which an upper housing is removed for showing internal construction of the actuator.

FIGS. 2 and 3 show the detailed construction of the preferred embodiment of the rotary actuator 100 according to the invention. The rotary actuator 100 comprises aforementioned housing 102, an output shaft 106, a rotor 108 and a stator 110. As clearly shown in FIG. 2, the housing 102 includes an upper cover member 112 and a lower cover member 114. The upper cover member 112 is of generally reversed bowl-shaped configuration having axially extending circumferential wall section 116 and laterally extending upper wall section 118 adjoining at the circumferential edge to the circumferential wall section. Similarly, the lower cover member 114 is of generally bowl-shaped configuration having axially extending circumferential wall section 117 and laterally extending lower wall section 119 adjoining at the circumferential edge of the circumferential wall section. The lower edge 116a of the circumferential section 116 of the upper cover member 112 has a projection 116b which engages with a groove 117b formed in the upper edge 117a of the circumferential wall section 117 of the lower cover member 114 in order to define an enclosed space 120 therebetween. The lower edge 116a of the circumferential wall section 116 of the upper cover member 112 and the upper edge 117a of the circumferential wall section 117 of the lower cover member 114 mating to each other are welding to each other by way of ultrasonic welding so as to establish air-tight seal therebetween. The output shaft 106, the rotor 108 and the stator 110 are housed within the enclosed space 120. Flanges 104 are fixed to the lower wall section 119 of the lower cover member 114.

The lower wall section 119 of the lower cover member 114 has a center section 122 extending downwardly from the general lower surface of the lower cover member 114 to form a boss section for the output shaft 106. An axially extending through opening 124 is formed through the boss section 122. The through opening 124 has an internal diameter substantially corresponding to the outer diameter of the piston rod 26. Therefore, the top end of the piston rod 26 is received within the aforementioned opening 124. An elastic seal ring 126 is provided to sealingly contact with the outer periphery of the piston rod 26 for establishing a seal therebetween. A bearing 128 is fitted onto the outer periphery of the boss section 122 for rotatably receiving the upper end portion of the piston rod 26. The top end of the actuation rod 70 extends from the top end of the piston rod 26 so that it engages with the lower end of the output shaft 106. The top end of the actuation rod 70 and the lower end of the output shaft 106 are keyed in an appropriate manner so that the actuator rod may rotate according to rotation of the output shaft 106.

Upper and lower magnetic conductor plates 130 and 132 are attached onto the lower surface of the upper wall section 118 of the upper cover member 112 and the upper surface of the lower wall section 119 of the lower cover member 114. The upper and lower magnetic conductor plates 130 and 132 are formed into essentially disc-shaped configuration. As seen from FIG. 2, the upper magnetic conductor plate 130 has a diameter essentially the same as the internal diameter of the upper wall section 118 of the upper cover member 112 so that it extends over essentially the entire periphery thereof. The upper magnetic conductor plate 130 is formed with essentially rectangular depressions 134 projecting downwardly, which rectangular depressions 134 are arranged with a predetermined regular intervals in the circumferential direction as seen from FIG. 3. In the shown embodiment, the upper magnetic conductor 130 is formed with six (6) depressions 134. The radial inner and outer circumferentially extending edges 136 and 138 of each depression 134 are tapered. On the other hand, the radially extending edges 140 of each depression 134 are sharply bent to form right angle edges so as to clearly define borders of magnetic flux.

Upper and lower bearings 144 and 148 are provided and engaged to the inner circumferential edges of the upper and lower magnetic conductor plates 130 and 132. An essentially cylindrical tube 142 is rotatably supported by the upper and lower bearings 144 and 148. The cylindrical tube 142 rotatably supports the output shaft 106. As seen from FIG. 2, the internal diameter of the cylindrical tube 142 is slightly greater than the external diameter of the output shaft 106 so as to leave a substantially small clearance therebetween. This clearance is formed in view of tolerance in production of the output shaft and the cylindrical tube and assure avoidance of interference therebetween. The output shaft 106 is formed with projections 106a projecting from the outer periphery thereof. The projections 106a engage with slots 142a formed in the upper end portion of the cylindrical tube 142 so that the output shaft 106 may be rotatingly driven together with the cylindrical tube 142.

The rotor 108 has a rotor body 150 made of a magnetically insulative synthetic resin as shown in FIG. 2, and is firmly secured on the outer periphery of the cylindrical tube 142. The rotor body 150 supports a plurality of permanent magnets 152. The rotor body 150 has an annular recess 154 which engages with the upper bearing 144. The rotor body 150 is further formed with grooves 156 radially extending from the outer peripheral edge thereof. The permanent magnets 152 are received in the grooves 156 at the radially inner ends thereof. As seen from FIG. 2, the upper surface of the permanent magnets 152 oppose the upper magnetic conductor plate 130 with a substantially small clearance defined therebetween. The permanent magnets 152 has radial length smaller than the upper magnetic conductor plate 130 and substantially equal to the lower magnetic conductor plate 132.

As seen from FIG. 3, in the shown embodiment, the permanent magnets 152 comprises two primary magnets 152a and 152b and two auxiliary magnets 152c and 152d. The primary and auxiliary magnets 152a, 152b, 152c and 152d are arranged in circumferential alignment with given circumferential intervals. As will be appreciated, the primary and auxiliary magnets 152a, 152b, 152c and 152d are arranged in symmetrical fashion with respect to the rotation axis of the output shaft. The primary magnets 152a and 152b have the same polarity to form magnetic fields with magnetic flux direction as represented by arrow x. On the other hand, the auxiliary magnets 152c and 152d are provided with the same polarity to each other which is opposite to that of the primary magnets 152a and 152b, to form magnetic fields with magnetic flux direction as represented by arrow y in FIG. 6.

Figure 4:
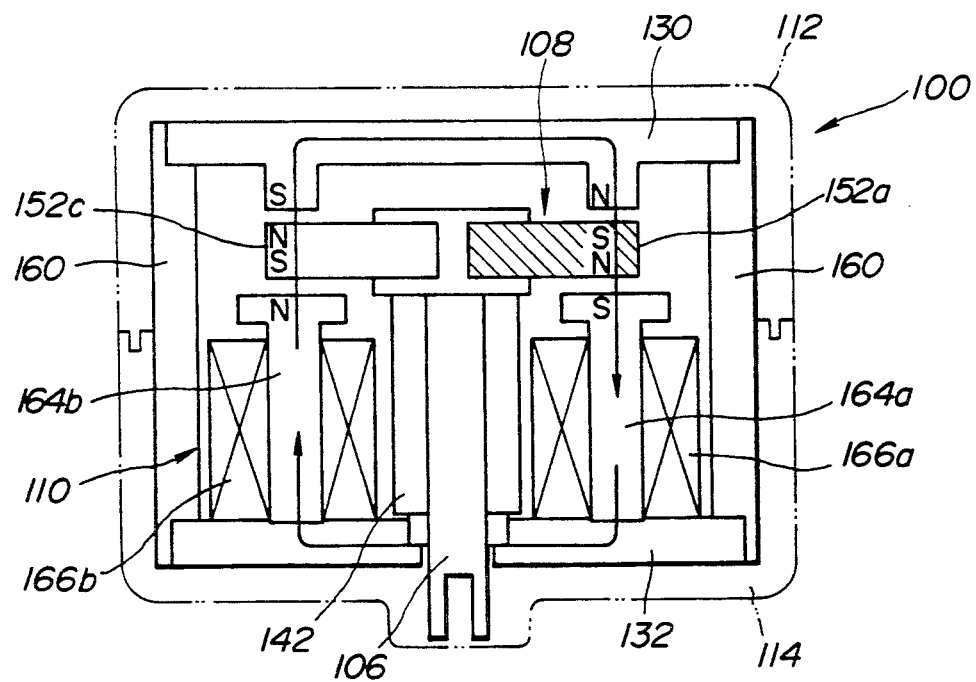
FIG. 4 is a fragmentary illustration of the preferred embodiment of a rotary actuator.

On the other hand, the stator 110 comprises a mounting base 160 made of a magnetically insulative synthetic resin material. The mounting base 160 has a radially inner portion contacting with the lower portion of the rotor body 150 so as to rotatably support the latter. The mounting base 160 mounts six (6) electromagnets 162a, 162b, 162c, 162d, 162e and 162f (only two are shown in FIG. 2 and all are shown in FIG. 4). The mounting base 160 is engaged and firmly secured to the lower bearing 148. On the other hand, the mounting base 160 are fixed between the upper and lower cover members 112 and 114 with maintaining the upper and lower magnetic conductor plates 130 and 132 in place.

The electromagnets 162a, 162b, 162c, 162d, 162e and 162f are arranged in circumferential alignment with a given circumferential intervals. Respective electromagnets 162a, 162b, 162c, 162d, 162e and 162f are secured in contact with the lower magnetic conductor plate 132. The electromagnets 162a, 162b, 162c, 162d, 162e and 162f comprises a magnetic cores 164a, 164b, 164c, 164d, 164e and 164f electromagnetic coils 166a, 166b, 166c, 166d, 166e and 166f wound around coil bobbins 168a, 168b, 168c, 168d, 168e and 168f which are formed integrally with the counting base 160. Respective magnetic cores 164a, 164b, 164c, 164d, 164e and 164f are secured to the lower magnetic conductor plate 132 at the lower ends and have tip ends mating with the lower surfaces of the permanent magnets 152a, 152b, 152c and 152d with a substantially small clearance therebetween.

Figure 6:
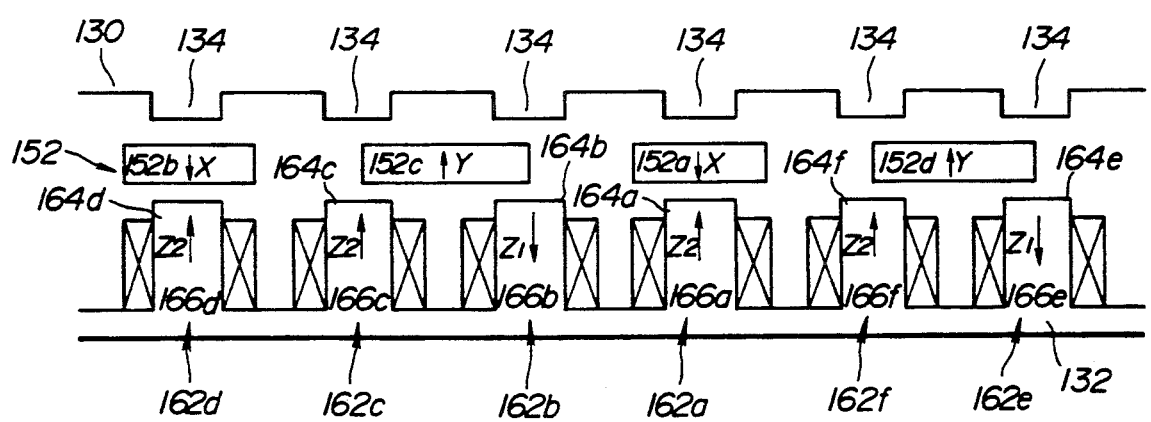
FIG. 6 is an explanatory illustration showing magnetical relationship between permanent magnets and electromagnets to be employed in the second embodiment of the rotary actuator.

Radially symmetrically arranged pairs of the electromagnetic 162a and 162d, 162b and 162e, and 162c and 162f form groups. These groups of the electromagnets 162a and 162d, 162b and 162e, and 162c and 162f are designed to be energized and deenergized as pairs. Each pair of electromagnets 162a and 162d, 162b and 162e, and 162c and 162f are so arranged as to have same polarity to each other when they are energized. In the shown embodiment, one pair of the electromagnets opposing the primary permanent magnets 152a and 152b are energized to form magnetic filed in a direction of $z_2$ which is opposite to the direction of the magnetic field of the primary permanent magnets 152a and 152b to generate repulsive force, as shown in FIG. 6. Similarly, at the same time, another pair of electromagnets opposing the auxiliary permanent magnets is energized in the opposite polarity $z_1$ to the aforementioned one pair of the electromagnets, the direction of the magnetic field of which another pair of electromagnets is opposite to that of the auxiliary permanent magnets for generating repulsive force. Simultaneously, the other pair of electromagnets partly opposing to the auxiliary permanent magnets are energized to establish the magnetic field in the same polarity to one pair of the electromagnets. This creates drawing force.

As shown in FIG. 4, with the construction set forth above, a closed magnetic circuit is formed by the pair of electromagnets 162a and 162d, the primary permanent magnets 152a and 152b opposing the electromagnets 162a and 162b, the upper magnetic conductor plate 130, the auxiliary magnets 152c and 152d, and the electromagnets 162b and 162e opposing the auxiliary magnets.

Therefore, in the shown embodiment, the three pair of electromagnets 162a and 162d, 162b and 162e, and 162c and 162f are cooperated with the primary and auxiliary permanent magnets 152a, 152b, 152c and 152d for driving the rotary valve member 66 at three angular positions via the output rod 106 and the actuator rod 70 by angular displacement of the rotor assembly 108. Therefore, in the shown embodiment, the damping characteristics of the shock absorber is variable between SOFT mode in which the smallest damping force is to be produced, HARD mode in which the greatest damping force is to be produced and a MEDIUM mode in which the damping force to be produced is intermediate between those produced in the SOFT mode in which the damping force to be produced is intermediate between those produced in the SOFT mode and the HARD mode. In the shown arrangement, it is assumed that the rotary valve member 66 is positioned at SOFT mode position when the electromagnets 162a and 162d are energized, at a MEDIUM mode position when the electromagnets 162b and 162d are energized, and at a HARD mode position when the electromagnets 162c and 162f are energized.

Figure 5:
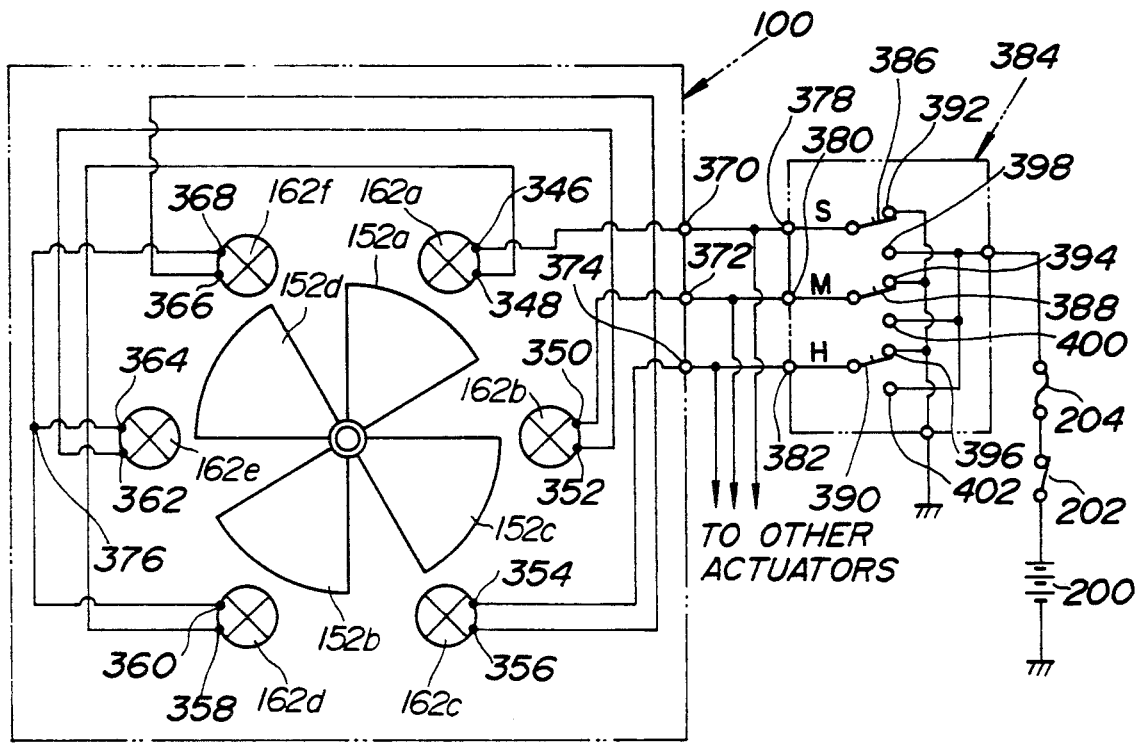
FIG. 5 is a circuit diagram of the preferred embodiment of a driver circuit for the rotary actuator.

FIG. 5 shows a circuit diagram of the first embodiment of a driver circuit for selectively energizing the electromagnets 162a, 162b, 162c, 162d, 162e and 162f for controlling the position of the rotary valve 66. In order to selectively energizing the electromagnets, a manually operable mode selector switch assembly 384 is provided in the driver circuit. In the shown embodiment, the mode selector switch assembly 384 is operable between a SOFT mode position, a MEDIUM mode position and a HARD mode position. The mode selector switch assembly 384 is disposed between a vehicular a power source and the actuator which composed of the electromagnets 162a, 162b, 162c, 162d, 162e and 162f. The power source includes a vehicular battery 200, a main witch 202, such as an ignition switch, and a fuse 204.

The electromagnets 162a, 162b, 162c, 162d, 162e and 162f respectively have two terminals 346, 348; 350, 352; 354, 356; 358, 360; 362, 364; and 364 and 366. The terminals 346 of the electromagnet 162a, the terminal 350 of the electromagnet 162b and the terminal 354 of the electromagnet 162c are respectively connected to input terminals 370, 372 and 374. On the other hand, terminal 348 of the electromagnet 162a is connected to the terminal 358 of the electromagnet 162d. The terminal 352 of the electromagnet 162b is connected to the terminal 362 of the electromagnet 162e. The terminal 356 of the electromagnet 162b is connected to the terminal 366 of the electromagnet 162f. On the other hand, the terminals 360, 364 and 368 are commonly connected to a junction 376.

The input terminals 370, 372 and 374 of the actuators are connected to output terminals 378, 380 and 382 of a mode selector switch assembly 384 which includes a SOFT mode contactor 386, a MEDIUM mode contactor 388 and a HARD mode contactor 390. These contactors 386, 388 and 390 are normally biased toward grounding terminals 392, 394 and 396 so that the output terminals 378, 380 and 382 of the mode selector switch assembly 384 is normally connected to the ground. On the other hand, the mode selector switch assembly 384 has power terminals 398, 400 and 402 respectively corresponding the the SOFT mode, MEDIUM mode and HARD mode contactors 386, 388 and 380. There power terminals 398, 400 and 402 are connected to the power source including the vehicular battery 200, the main switch 202 and the fuse 204.

Figure 7:
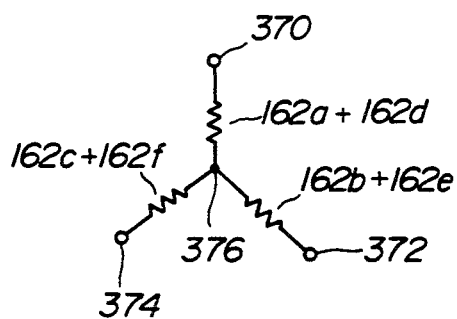
FIG. 7 is an illustration of the internal circuit showing connection of an electromagnet employed in the preferred embodiment of the driver circuit for the rotary actuator of the present invention.

The connection of the electromagnetic coils 166a, 166b, 166c, 166d, 166e and 166f of respective electromagnets 162a, 162b, 162c, 162d, 162e and 162f in the shown embodiment can be shown in FIG. 7 to form Y-connection.

With the foregoing construction, when mode selector switch assembly 314 is manually operated to select one of the SOFT, MEDIUM and HARD modes, the corresponding one of pairs of electromagnets 162a and 162d, 162b and 162e or 162c and 162f are energized to generate magnetic fields in upward direction y. Namely, the electromagnets 162a and 162d, 162b and 162e or 162c and 162f as energized form N pole at the side remote from the rotor assembly and S pole at the side adjacent the rotor assembly and whereby generate magnetic field in the upward direction $z_1$. On the other hand, remaining two pairs of electromagnets are also energized in the shown embodiment to form N pole adjacent the rotor assembly and S pole at the side remote from the rotor assembly to generate the magnetic field in downward direction $z_2$, as shown in FIG. 6. Therefore, the primary permanent magnets 152a and 152b having N pole adjacent the electromagnets are drawn to be vertically aligned with the electromagnets 162a and 162d, 162b and 162e or 162c and 162f having the S pole adjacent the rotor assembly. On the other hand, the auxiliary permanent magnets 152c and 152d having S pole adjacent the stator repulse against the magnetic fields formed around the S pole of the electromagnets 162a and 162d, 162b and 162e or 162c and 162f formed adjacent to the stator assembly and drawn by the N pole formed in the other two pairs of electromagnets. These repulsion force and drawing force of the electromagnets having N pole adjacent the stator assembly serve for driving the rotor 108 at the position corresponding to the designed one of the SOFT, MEDIUM and HARD modes.

In addition, though the shown embodiments have been directed to the shock absorbers whose damping modes are manually selected through manually operable mode selector switch assemblies, it would be possible to select the damping mode automatically depending upon the vehicle driving condition, such as road roughness, vehicular rolling magnitude, vehicular pitching magnitude and so forth.

As will be appreciated herefrom, the present invention fulfills all of the objects and advantages sought therefore.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A rotary actuator for a variable damping force shock absorber for rotatingly driving a rotatable member, comprising:
   a rotary shaft connected to the rotatable member for rotation therewith;
   a rotor assembly cooperating with said rotary shaft for rotation therewith and carrying at least one permanent magnet;
   a stator assembly provided essentially in axial alignment with said rotor assembly and including a plurality of electromagnets selectively energized to have polarity according to polarity of power supply for selectively generating magnetic fields extending through said permanent magnet for rotatingly driving said rotor assembly;
   switch means for controlling polarity of power supply for respective electromagnets for energizing the latter according to a predetermined schedule; and
   an enclosed housing for receiving said rotary shaft, said rotor assembly and said stator assembly therein;
   said stator assembly further including:
   a first magnetically conductive plate opposing said rotor assembly with a given gap relative to the permanent magnet;
   a second magnetically conductive plate opposing the electromagnets and in magnetic communication therewith; and
   a non-magnetic supporting member within said housing retaining said first and second magnetically conductive plates with a preselected interval therebetween so as to oppose each other through said rotor and stator assemblies to provide magnetic paths for conducting magnetic waves, from said first and second magnetically conductive plates, through the electromagnets.

2. A rotary actuator as set forth in claim 1, wherein said housing comprises an upper member and a lower member respectively having first sections extending essentially perpendicular to said rotary shaft and second sections extending from a peripheral edge of said first sections toward the other member, said second sections having end edges mating to corresponding edges on said other member.

3. A rotary actuator as set forth in claim 2, wherein said second section of one of said upper and lower members is formed with a groove extending along said tip end edge and said second section of the other of said upper and lower members is provided a projection extending from said tip end edge and having configuration conforming with said groove, said projection engaging with said groove when said housing is assembled for establishing an air-tight seal therebetween.

4. A rotary actuator as set forth in claim 1, wherein said rotor assembly comprises a rotor body rotatably cooperated with said rotary shaft and having retainer sections made of a magnetically insulative synthetic resin and supporting said permanent magnet.

5. A rotary actuator as set forth in claim 1, wherein said first and second magnetically conductive plates are of annular disk-shaped configuration, forming a complete circle extending along a rotational trace of said permanent magnet.

6. A rotary actuator as set forth in claim 5, wherein said first magnetically conductive plate has a plurality of projecting portions, each having a plane surface and projecting toward said permanent magnet for opposing to the latter with said given gap, and a remaining portion having a plane surface opposing said permanent magnet with a clearance greater than said given gap.

7. A rotary actuator as set forth in claim 6, wherein each of said projecting portions has tapered circumferentially extending edges and sharply bent radially extending edges forming right angle edges so as to define a border of the magnetic field.

8. A rotary actuator as set forth in claim 1 wherein the first and second magnetically conductive plates comprise upper and lower magnetic conductor plates formed into an essentially disk-shaped configuration including essentially rectangular depressions arranged in a predetermined regular intervals in the circumferential direction.

9. A rotary actuator as set forth in claim 1, wherein said rotary assembly includes a main permanent magnetic plate and a sub permanent magnetic plate which are magnetized in opposite directions and arranged on a plane perpendicular to the rotary shaft.

10. A rotary actuator as set forth in claim 9, wherein said main permanent magnetic plate is provided with a pair of first magnets which are opposed diametrically with respect to the rotary shaft and a pair of second magnets which are opposed diametrically with respect to the rotary shaft.

11. A rotary actuator as set forth in claim 1, wherein said non-magnetic supporting member is arranged coaxially with respect to the rotary shaft so as to further retain the rotor assembly with the permanent magnet spaced from said first magnetically conductive plate by the given air gap.

12. A rotary actuator as set forth in claim 11, wherein said non-magnetic supporting member provides coil bobbins around which solenoids of the electromagnets are wound and into which magnetic cores are inserted.

13. A rotary actuator as set forth in claim 12, wherein said enclosed housing is made of non-magnetic material.

14. A rotary actuator for a variable damping force shock absorber which includes a rotary valve driven by said rotary actuator for varying damping characteristics, comprising:
   a rotary shaft connected to a rotatable member for rotation therewith;
   a rotor assembly including a plurality of permanent magnets including a first permanent magnet having a first pole at a first side and a second pole at a second side thereof and a second permanent magnet having said second pole at said first side and said first pole at said second side, said permanent magnets being associated with said rotary shaft for rotatingly driving the latter according to angular displacement thereof;
   a stator assembly provided essentially in alignment with said rotor assembly along the axis of said rotary shaft and opposing to said first side of said permanent magnet, said stator assembly including a plurality of electromagnets which are arranged at axially spaced apart relationship with said permanent magnet with a predetermined clearance in a direction of the axis of said rotary shaft, each of said electromagnets being adapted to be energized in first mode to have said second pole at the side adjacent said permanent magnet and said first pole at the side remote from said permanent magnet when it opposes said first permanent magnet, and in second mode to have said first pole at the side adjacent said permanent magnet and said second pole at the side remote from said permanent magnet when it opposes said second permanent magnet;

switch means for selectively energizing said electromagnets for rotatingly driving said permanent magnet with said rotatable member via said rotary shaft;

an enclosed housing for receiving said rotary shaft, said rotor assembly and said stator assembly therein;

a first magnetically conductive plate opposing said rotor assembly with a given air gap relative to the permanent magnet;

a second magnetically conductive plate opposing the electromagnets and in magnet communication therewith; and a non-magnetic supporting member within said housing retaining said first and second magnetically conductive plates with a preselected interval therebetween so as to oppose each other through said rotor and stator assemblies to provide magnetic paths for conducting magnetic waves from said first and second magnetically conductive plates through the electromagnets.

15. A rotary actuator as set forth in claim 14, wherein said housing comprising an upper member and a lower member respectively having first sections extending essentially perpendicular to said axis of said rotary shaft and second sections extending from peripheral edges of said first sections toward the other member, said second sections having tip end edges mating to each other.

16. A rotary actuator as set forth in claim 15, wherein said second section of one of said upper and lower members is formed with a groove extending along said tip end edge and said second section of the other of said upper and lower members is provided a projection extending from said tip end edge and having a configuration conforming with said groove, said projection engaging with said groove when said housing is assembled for establishing an air-tight seal therebetween.

17. A rotary actuator as set forth in claim 14, wherein said rotor assembly comprises a rotor body rotatably, cooperating with said rotary shaft and having retainer sections made of a magnetically insulative synthetic resin and supporting said permanent magnets in a circumferentially spaced relationship to each other with a given intervals.

18. A rotary actuator as set forth in claim 14, wherein said first magnetically conductive plate is disposed between said permanent magnet of said rotor assembly and a mating peripheral wall of said housing and has a plane surface opposing to said permanent magnet with said given air gap, and said second magnetically conductive plate is disposed between said electromagnets of said stator assembly and magnetically connected thereto.

19. A rotary actuator as set forth in claim 14, wherein said first and second magnetically conductive plates are of annular disc-shaped configurations forming a complete circle extending along a rotational trace of said permanent magnet.

20. A rotary actuator as set forth in claim 19, wherein said first magnetically conductive plate has a plurality of projecting portions, each having a plane surface and projecting toward said permanent magnet for opposing to the latter with said given air gap, and a remaining portion having a plane surface opposing said permanent magnet with a clearance greater than said given air gap.

21. A rotary actuator as set forth in claim 20, wherein each of said projecting portions has tapered circumferentially extending edges and a sharply bent radially extending edge forming a right angle edge so as to define a border of the magnetic field.

22. A rotary actuator as set forth in claim 14 wherein the first and second magnetically conductive plates comprise upper and lower magnetic conductor plates formed into an essentially disk-shaped configuration including essentially rectangular depressions arranged in a predetermined regular interval in the circumferential direction.

23. A variable damping force shock absorber for an automotive suspension system, comprising:

a shock absorber cylinder defining a fluid chamber therein, which shock absorber cylinder is disposed between a sprung mass and an unsprung mass of the automotive suspension system;

a piston disposed within said fluid chamber of said shock absorber cylinder and dividing said fluid chamber into upper first and lower second pressure chambers;

a piston rod connecting said piston to one of said sprung and unsprung mass for causing thrusting movement along said shock absorber cylinder;

fluid communication path means defining a fluid communication path for establishing fluid communication between said first and second pressure chambers;

a rotary valve member disposed within said fluid communication path for adjusting path area of said fluid communication path for thereby adjusting damping characteristics of said shock absorber;

a rotary actuator for rotatingly driving a rotatable member, including:

a rotary shaft connected to a rotatable member for rotation therewith;

a rotor assembly cooperating with said rotary shaft for rotation therewith and carrying a plurality of permanent magnets;

a stator assembly provided essentially in axial alignment with said rotor assembly and including a plurality of electromagnets selectively energized to have polarity according to polarity of power supply for selectively generating magnet fields extending through said permanent magnets for producing repulsive force and drawing force serving as driving force for rotatingly driving said rotor assembly;

switch means for controlling polarity of power supply for respective electromagnets for energizing the latter according to a predetermined schedule;

an enclosed housing for receiving said rotary shaft, said rotor assembly and said stator assembly therein, said housing being formed of a synthetic resin material;

a first magnetically conductive plate opposing said rotor assembly with a given air gap relative to the permanent magnets;

a second magnetically conductive plate opposing the electromagnets and in magnetic communication therewith; and a non-magnetic supporting member within said housing retaining said first and second magnetically conductive plates with a preselected interval therebetween so as to oppose each other through said rotor and stator assemblies to provide magnetic paths for conducting magnetic waves from said first and second magnetically conductive plates through the electromagnets; and a mode selector means associated with said actuator, for selecting one of a plurality of damping characteristics modes and for selectively energizing one of said electromagnets corresponding to selected one of damping characteristics modes.

24. A variable damping force shock absorber as set forth in claim 23, wherein said housing comprising an upper member and a lower member respectively having first sections extending essentially perpendicular to said axis of said rotary shaft and second sections extending from peripheral edges of said first sections toward the other member, said second sections having tip end edges mating to each other.

25. A variable damping force shock absorber as set forth in claim 21, wherein said second section of one of said upper and lower members is formed with a groove extending along said tip end edge and said second section of the other of said upper and lower members is provided a projection extending from said tip end edge and having a configuration conforming with said groove, said projection engaging with said groove when said housing is assembled for establishing an airtight seal therebetween.

26. A variable damping force shock absorber as set forth in claim 25, wherein said rotor assembly comprises a rotor body rotatably cooperated with said rotary shaft and having retainer sections made of a magnetically insulative synthetic resin and supporting said permanent magnets in a circumferentially spaced relationship to each other with given intervals.

27. A variable damping force shock absorber set forth in claim 26, wherein said first magnetically conductive plate is disposed between said permanent magnet of said rotor assembly and a mating peripheral wall of said housing and has a plane surface opposing to said permanent magnet with said given air gap, and said second magnetically conductive plate is disposed between said electromagnets of said stator assembly and magnetically connected thereto.

28. A variable damping force shock absorber as set forth in claim 23, wherein said first and second magnetically conductive plates are of annular disc-shaped configurations forming a complete circle extending along a rotational trace of said permanent magnet.

29. A variable damping force shock absorber as set forth in claim 28, wherein said first magnetically conductive plate has a plurality of projecting portions, each having a plane surface and projecting toward said permanent magnet for opposing to the latter with said given air gap, and a remaining portion having a plane surface opposing said permanent magnet with a clearance greater than said given air gap.

30. A variable damping force shock absorber as set forth in claim 29, wherein each of said projecting portions has tapered circumferentially extending edges and a sharply bent radially extending edge forming a right angle edge so as to define a border of the magnetic field.

31. A variable damping force shock absorber as set forth in claim 30, wherein said actuator is mounted at the top of said piston rod and fixed onto a top wall of a strut housing of a vehicle body as said sprung mass.

32. A variable damping force shock absorber as set forth in claim 31, wherein said rotary valve member is rotatingly operable for varying angular positions at least between a first damping characteristics mode position for generating a harder damping force and a second damping characteristics mode position for generating a softer damping force.

33. A variable damping force shock absorber as set forth in claim 32, wherein said stator assembly is provided with at least first and second electromagnets respectively connected to said mode selector means to be selectively energized when a corresponding one of said first and second damping characteristics mode is selected through said mode selector means, said first and second electromagnets being arranged circumferentially at mutually different first and second angular positions respectively corresponding to said first and second damping characteristics mode positions.

34. A variable damping force shock absorber as set forth in claim 30, wherein said piston defines a fluid flow path providing primary working fluid communication between said first and second pressure chambers of said shock absorber cylinder.

35. A variable damping force shock absorber as set forth in claim 34, wherein said communication path means defines said communication path bypassing said fluid flow path.

36. A variable damping force shock absorber as set forth in claim 35, wherein said piston defines first and second fluid flow paths and has first and second one-way flow control valves, said first one-way flow control valve establishing a fluid flow through said first fluid flow path and blocking fluid flow through said second fluid flow path in a piston bounding stroke, and said second one-way flow control valve establishing a fluid flow through said second fluid path and blocking fluid flow through said first fluid flow path in a piston rebounding stroke.

37. A variable force shock absorber as set forth in claim 36, wherein said communication path means comprises means for defining an axially extending opening through said piston rod, which axially extending opening opens toward said second pressure chamber, and means for defining a radially extending orifice through the peripheral wall of said piston rod having an outer end opening toward said first pressure chamber and an inner end opening toward said axially extending opening, and said rotary valve has first and second flow control orifices respectively oriented to be aligned to said radially extending orifice at respective first and second damping characteristics mode positions for establishing fluid communication between said radially extending orifice and said axially extending opening, said first and second flow control orifices being provided different fluid path areas.

38. A variable damping force shock absorber as set forth in claim 37, wherein said stator assembly is provided with at least first and second electromagnets respectively connected to said mode selector means to be selectively energized when a corresponding one of said first and second damping characteristics mode positions is selected through said mode selector means, said first and second electromagnets being arranged circumferentially at mutually different first and second angular positions respectively corresponding to said first and second damping characteristics mode positions.

39. A variable damping force shock absorber as set forth in claim 23, wherein said piston defines a fluid flow path providing primary working fluid communication between said first and second pressure chambers of said shock absorber cylinder.

40. A variable damping force shock absorber as set forth in claim 39, wherein said communication path means defines said communication path bypassing said fluid flow path.

41. A variable damping force shock absorber as set forth in claim 40, wherein said piston defines first and second fluid flow paths and has first and second one-way flow control valves, said first one-way flow control valve establishing fluid flow through said first fluid flow path and blocking fluid flow through said second fluid flow path in a piston bounding stroke, and said second one-way flow control valve establishing fluid flow through said second fluid path and blocking fluid flow through said first fluid flow path in a piston rebounding stroke.

42. A rotary actuator as set forth in claim 23, wherein the first and second magnetically conductive plates comprise upper and lower magnetic conductor plates formed into an essentially disk-shaped configuration including essentially rectangular depressions arranged in a predetermined regular interval in the circumferential direction.

* * * * *